(12) United States Patent
Herzog (10) Patent No.: US 8,727,098 B2
(45) Date of Patent: May 20, 2014

(54) DIVERTER ARM AND METHOD (71) Applicant: Kenneth J. Herzog, Hampton Bays, NY (US)

(72) Inventor: Kenneth J. Herzog, Hampton Bays, NY (US)

(73) Assignee: Auto Kaps, LLC, Riverhead, NY (US)

(*) Notice: Subject to any disclaimer, the term of this patent is extended or adjusted under 35 U.S.C. 154(b) by 0 days.

(21) Appl. No.: 13/863,753

(22) Filed: Apr. 16, 2013

(65) Prior Publication Data
US 2014/0069773 A1 Mar. 13, 2014

Related U.S. Application Data (62) Division of application No. 11/181,287, filed on Jul. 14, 2005, now Pat. No. 8,430,228.

(51) Int. Cl.
B65G 47/14 (2006.01)

(52) U.S. Cl.
USPC .............................. 198/394; 198/392; 198/771

(58) Field of Classification Search
None
See application file for complete search history.

(56) References Cited

U.S. PATENT DOCUMENTS

| | | | |
|---|---|---|---|
| 2,928,521 A | 3/1960 | Johnson | |
| 3,209,888 A * | 10/1965 | Sterling | 198/388 |
| 3,392,816 A | 7/1968 | Cox | |
| 3,640,373 A | 2/1972 | Seragnoli | |
| 3,910,407 A | 10/1975 | Sterling | |
| 3,948,386 A | 4/1976 | Nalbach | |
| 4,138,009 A | 2/1979 | Strong | |
| 4,362,234 A | 12/1982 | McDonald | |
| 4,979,607 A | 12/1990 | Fogg | |
| 5,240,118 A | 8/1993 | Mayer | |
| 5,443,149 A | 8/1995 | Rohwetter | |
| 5,954,185 A | 9/1999 | Eshelman | |
| 6,435,338 B1 * | 8/2002 | Iwamoto | 198/803.5 |

* cited by examiner

Primary Examiner — Kavel Singh
(74) Attorney, Agent, or Firm — Ostrolenk Faber LLP (57) ABSTRACT A system for aligning items, such as bottles, includes a rotating plate and a diverter arm that extends outward over a top surface of the plate towards the plate edge. A rotating channel may surround the plate. In operation, bottles are dropped onto the plate and rotated by the plate against the arm. The distance between the top surface of the arm and the plate surface is such that the arm generally diverts the bottles outward and guides them into free gaps within the channel. The distance is also configured such that as bottles back-up, waiting for free channel gaps, the arm allows any buckling bottles to pass over and back onto the plate, rather than into the channel. The distance may also be configured such that the arm acts like a scoop. As bottles back-up behind the arm, the arm presses under the bottles along the arm and passes them over, relieving the pressure.

7 Claims, 7 Drawing Sheets

DIVERTER ARM AND METHOD

This application is a divisional application of Ser. No. 11/181,287 filed on Jul. 14, 2005, entitled DIVERTER ARM AND METHOD, the entire contents of which are hereby incorporated by reference.

BACKGROUND OF THE INVENTION

1. Field of the Invention

The present invention relates to systems and methods for aligning randomly oriented items and more particularly, to an arm-like structure and the use thereof for aligning randomly oriented items.

2. Description of the Art

Figure 1:
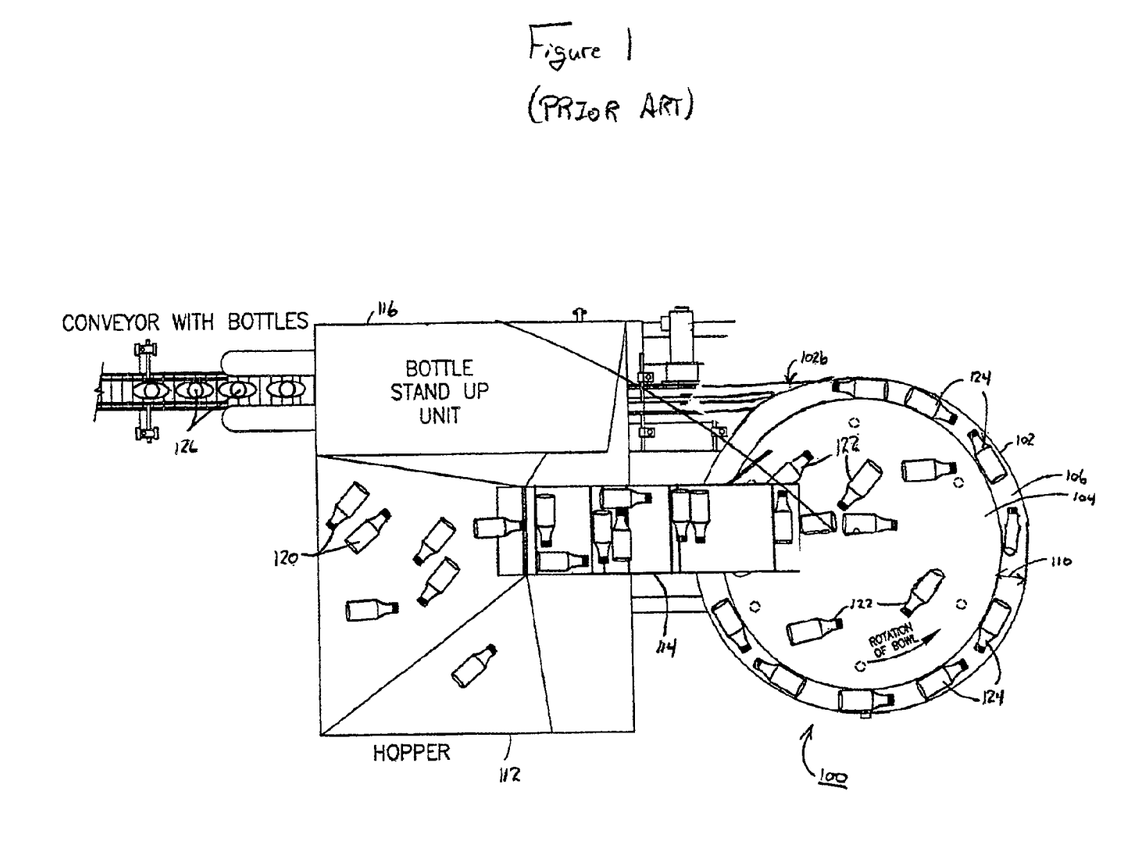
FIG. 1 shows a top plan view of a prior art system that aligns and orders randomly oriented bottles through a rotating plate and a rotating channel.
Figure 2:
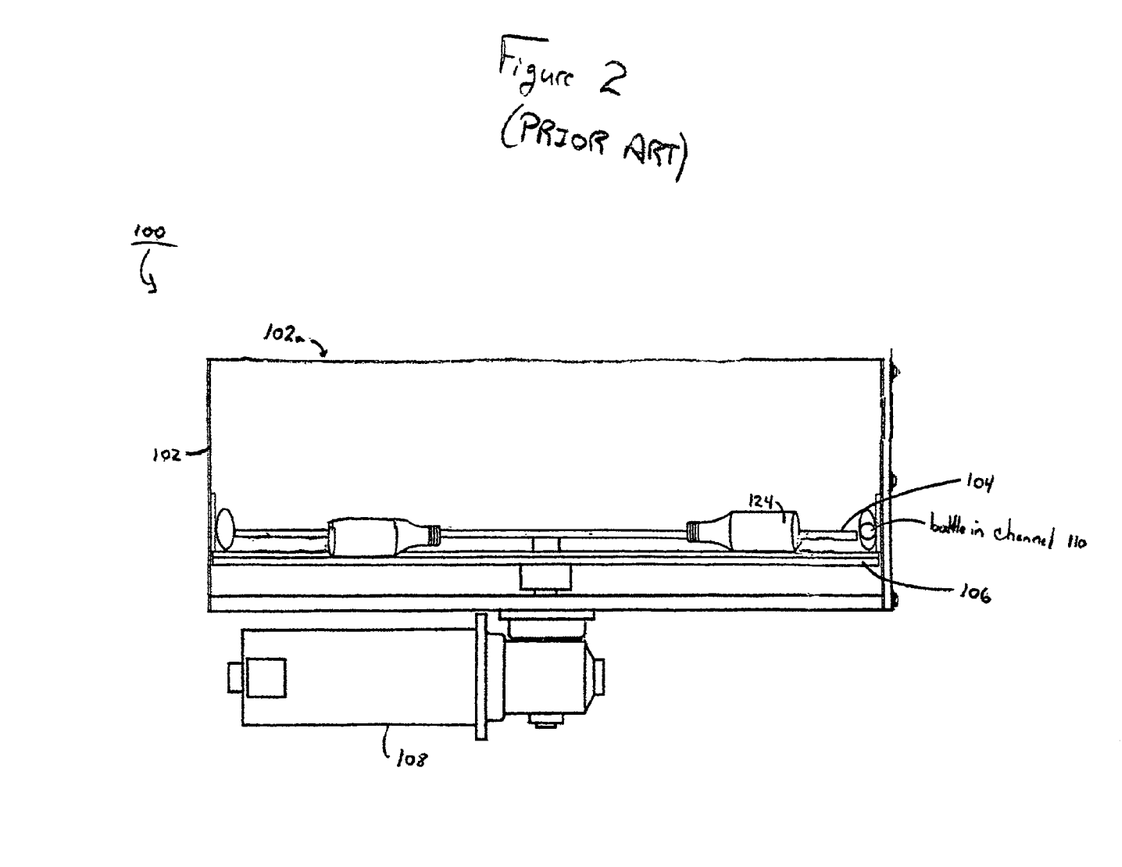
FIG. 2 shows a side plan view of the prior art system illustrated by FIG. 1.

Systems are generally known for taking a plurality of items, such as bottles, that are supplied in a random and disorderly fashion and for ordering and aligning these items for subsequent processing. For example, referring to the Figures in which like reference numerals refer to like elements, there is shown in FIG. 1 and FIG. 2 a top view and a side view, respectively, of an example prior art unscrambling system 100 that orders and aligns "randomly oriented" bottles so that as the bottles leave system 100, they are disposed in a row with their tops and bottoms facing one another in an end-to-end fashion. In this orientation, subsequent systems, such as stand-up unit 116, can stand the bottles on end so that the bottles can be subsequently filled and capped.

More specifically, example system 100 includes a tub 102 with an opening 102a on its top side and an additional opening 102b along its exterior wall. A rotating plate 104 is situated within tub 102 and is connected to motor 108, which causes the plate to freely rotate within the tub. In this example system, a second rotating plate 106 is situated beneath plate 104 and is also connected to motor 108, which causes this plate to rotate. Plate 104 has a smaller diameter than plate 106 and is spaced above plate 106, thereby forming a channel 110 between the outer perimeter of plate 104 and the inner perimeter of tub 102. Through the rotation of plate 106, items situated within channel 110 move (i.e., rotate) around the inner perimeter of tub 102.

In operation, a hopper 112 and conveyor 114 mechanically feed randomly oriented bottles 120 into tub 102 and onto rotating plate 104 (e.g., as shown by bottles 122). As plate 104 rotates, it causes bottles 122 to move towards the outward perimeter of the tub and into channel 110 such that once in the channel, the bottles are aligned with their tops and bottoms facing one another (e.g., as shown by bottles 124). Once in this orientation, rotating plate 106 moves the bottles towards opening 102b, where the bottles exit tub 102 and enter bottle stand up unit 116, for example, where the bottles are subsequently stood on end (e.g., as shown by bottles 126).

Overall, the intent of bottle unscrambling systems like that of system 100 is to maximize the number of aligned bottles exiting tub 102. As such, system 100 needs to ensure that a maximum number of properly aligned bottles are situated within channel 110 at all times. Accordingly, system 100 needs to maximize the movement of random bottles from plate 104 into channel 110 and needs to ensure these bottles are properly aligned once within the channel.

Prior bottle unscrambling systems like system 100, however, have the problem that as random bottles enter tub 102, they often remain on plate 104 and fail to move towards the outer perimeter of the tub. To overcome this problem, prior systems have increased the rotational speed of plate 104 to help force the bottles outward. While this solution solves the problem of moving bottles off plate 104, the increased rotational speed of plate 104 often causes the bottles to move outward too fast. As a result, bottles do not enter the channel in an orderly fashion and tend to bunch-up, thereby impeding the movement of bottles into open/available spaces within the channel. In addition, the increased speed of the bottles leaving plate 104 often causes the bottles to enter the channel even when space is not available, resulting in the bottles overlapping and stacking upon bottles already in the channel. As a result, these overlapping bottles must be removed from the channel prior to exiting the system at opening 102b.

Other prior systems have addressed the problem of bottles remaining on plate 104 by replacing plate 104 with a rotating circular cone that angles downward towards channel 110. In general, the conical shape of the rotating cone naturally moves bottles from the center of the cone towards channel 110. However, this solution also tends to move the bottles outward too fast, resulting in the same problems as just described.

Still other systems, such as those described, for example, in U.S. Pat. No. 3,910,407 by Walter Sterling, U.S. Pat. No. 5,443,149 by Norbert Rohwetter et al., and U.S. Pat. No. 4,362,234 by Walter McDonald et al., have used an arm-like structure to move items (e.g., bottle tops and bottles) from a rotating plate (like plate 104) towards the plate's outer perimeter. In these example systems, the arm-like structure resides in a stationary position over the surface of the rotating plate and essentially extends radially outward towards the outer perimeter of the plate. As the plate rotates, items on the surface of the plate move towards the arm, which blocks the items' forward movement and causes the items to move outward. In the systems described by Sterling and Rohwetter, the items are guided off the plate and towards an outer channel. In the system described by McDonald, the items are guided to an outer periphery of the plate and are aligned along an outer wall of the system.

Nonetheless, these systems continue to experience the problem of items becoming overlapped (either within the channel or along the outer wall of the system) and use other mechanisms to further resolve this problem. For example, in the system disclosed by Sterling, a rail is inserted at a spaced distance above the channel, which rail shields overlapping bottle caps from entering the channel. Air jets subsequently move these overlapping caps back onto the rotating plate. In the system disclosed by Rohwetter, a motorized/spinning brush is placed over the channel. The brush moves overlapping bottles situated in the channel back onto the rotating plate. In the system disclosed by McDonald, container caps are passed through a limited height opening that removes any overlapping caps.

In still other bottle-aligning systems that have used an arm-like structure to guide bottles off a rotating plate and into a channel, a problem experienced is that as the arm blocks the bottles and the bottles wait to enter available openings in the channel, the bottles tend to bunch-up and buckle, thereby impeding the movement of the bottles into available openings within the channel. In addition, because the bottles buckle, they tend to enter the channel overlapping and stacking upon bottles already in the channel.

SUMMARY

Accordingly, it is desirable to provide an unscrambling system for aligning items, such as bottles, that overcomes the above and other disadvantages of the prior art. According to an example embodiment of the present invention, a diverter arm is situated within an unscrambling system such that the arm extends radially outward over a top surface of a rotating plate, for example, and diverts bottles situated on the plate towards the system's outer perimeter where the bottles are aligned. Unlike prior arm-like structures that have been used to direct items outward, however, the diverter arm of the present invention does not completely block the forward movement of bottles as they rotate on the plate. Rather, the diverter arm of the present invention only impedes the forward motion, continuing to direct bottles outward but also allowing the bottles to flow over the arm as an increased number of bottles collect behind the arm.

Specifically, according to an example embodiment of the invention, an unscrambling system includes two parallel rotating plates, one at a spaced distance above the other, with the top plate being smaller than the bottom plate. In this way, the two plates form a recessed channel around the perimeter of the top plate, the channel acting as an aligning mechanism. Situated over the top surface of the top plate is, a diverter arm of the present invention that extends from the center of the plate, for example, outward to approximately the plate's outer perimeter, for example. Alternatively, the diverter arm may extend in two or more directions towards the top plate's outer perimeter. The top side or top surface of the diverter arm is configured at a distance above the surface of the top plate (also referred to as the height of the diverter arm). Preferably, this distance is uniform over the length of the diverter arm. The arm preferably remains in a stationary position relative to the plate.

According to an example embodiment of the invention, the top plate may be interchangeable, for example, with other plates of varying diameters, thereby varying the width of the channel. The diverter arm may also be interchangeable, for example, so that the length of the arm can be set to correspond to the radius/diameter of the top plate currently in use. According to another aspect of the invention, the height of the diverter arm may be adjustable to correspond to the size of the bottles being aligned, for example.

According to an example embodiment of the invention, randomly oriented bottles are initially dropped onto the surface of the top plate. Generally, the bottles will land on their sides. Through the rotation of the top plate, some bottles may move outward and into the channel, where the bottles are aligned with their bottoms and tops facing one another and are subsequently discharged from the system through the rotation of the bottom plate. Other bottles, however, will rotate in a forward direction with the top plate and will contact the diverter arm, for example.

According to an example embodiment of the invention, the height of the diverter arm is configured such that the arm impedes the forward motion of the bottles and guides/diverts these bottles outward towards the channel. The bottles will remain along the arm until a gap is encountered in the channel, at which point the arm will guide the bottles into this gap.

Unlike the arm structures of prior systems, however, the diverter arm of the present invention is not a wall-like structure that blocks all forward movement of the bottles. Rather, the height of the diverter arm allows some bottles to pass over the arm. Specifically, assuming space is not immediately available in the channel, multiple bottles may begin to bunch-up around the diverter arm, for example. As bottles continue to back-up, the increased pressure on the bottles may cause some bottles to buckle upward, for example, relative to the top plate. According to an example embodiment of the invention, rather than continuing to block these buckling bottles and forcing these bottles outward to the channel, the height of the diverter arm is configured such that the buckling bottles extend above the top side of the diverter arm. In this position, the diverter arm is no longer able to divert the bottles and the bottles get pushed over the arm and back onto the surface of the top plate. Here, the passed bottles continue in a forward direction either moving outward and into the channel or back around to the diverter arm.

In addition to simply allowing buckled bottles to pass over the arm, according to an example embodiment of the invention, the height of the diverted arm is also configured such that the arm pro-actively alleviates bottle-necks behind the arm. Specifically, the height of the arm is configured such that as flat lying bottles, for example, initially contact the arm, the pressure exerted on these bottles by the rotating top plate is sufficient to cause the bottles to divert outward, but is not sufficient to cause the bottles to divert upward relative to the arm. As an increased number of bottles begin to back-up behind the arm, however, the pressure on the bottles along the arm will naturally increase. As this pressure increases on the bottles along the arm, these bottles will find it easier to move over the arm, rather than along the arm. As such, the arm will begin to act like a scoop, for example, pushing under these bottles and causing them to buckle and pass over the arm and back onto the plate.

Advantageously, because the diverter arm of the present invention allows buckling bottles to move up and over the arm rather than completely blocking their forward motion, the bunching up of bottles behind the arm is relieved, thereby allowing bottles to more freely enter the channel and fill available openings. In addition, rather than the buckling bottles entering the channel and thereby overlapping and stacking upon one another, buckling bottles by-pass the channel and continue forward. As a result, a diverter arm according to an example embodiment of the invention increases the flow of bottles moving from the plate towards the channel while also preventing the bunching and buckling of bottles along and within the channel and as such, increases the number of properly aligned bottles that reside in the channel.

According to another example embodiment of the invention, an unscrambling system includes a single rotating plate surrounded by a stationary wall that acts as an aligning mechanism. Situated over the top surface of the plate is a diverter arm of the present invention that extends from the center of the plate, for example, outward towards the plate's outer perimeter, for example. Here, bottles are dropped onto the plate and diverted outward towards the wall such that the bottles align along the wall with their bottoms and tops facing one another. As such, a spaced gap exists between the end of the diverter arm and the inner perimeter of the wall to allow bottles to pass between the arm and wall. As an example, this spaced gap can correspond to the approximate width of a single bottle. In this way, the diverter arm causes a single row of aligned bottles to form around the inner perimeter of the wall.

Similar to above, the diverter arm according to this example embodiment of the invention is configured to have a height above the surface of the plate such that the arm does not function as a wall-like structure that blocks all forward movement of bottles on the plate. Rather, the height is configured so that the diverter arm only impedes this forward movement and allows buckling bottles to pass over the arm and in a further aspect, is configured so that the arm operates as a scoop-like structure, for example, as described above.

Other features and advantages of the present invention will become apparent from the following description of the invention, which refers to the accompanying drawings.

DESCRIPTION OF THE EMBODIMENTS

For purposes of illustrating example embodiments of the present invention, the invention will be described using bottles as an example item to be aligned and ordered. However, one skilled in the art will recognize that the diverter arm of the present invention is also applicable, for example, to systems that align/order other items, such as tops to bottles.

Figure 3A:
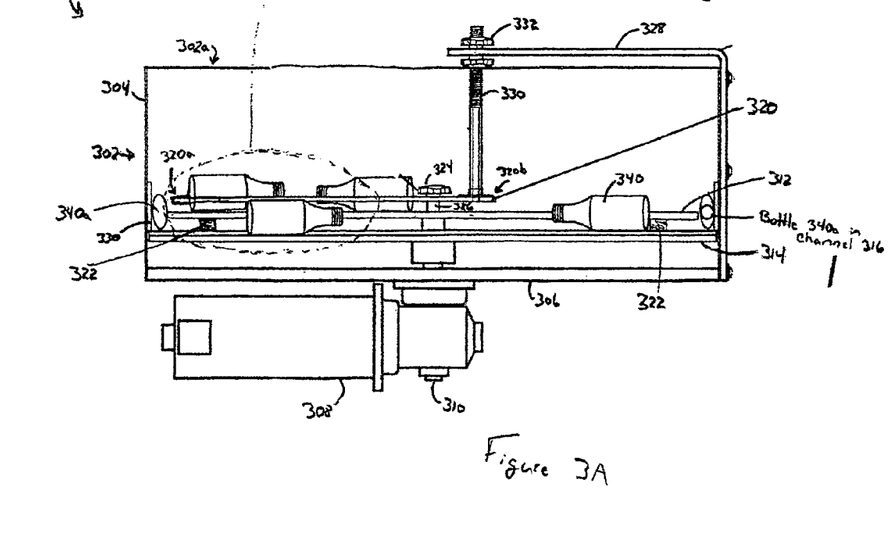
FIG. 3A shows a side plan view of an example diverter arm according to the present invention where the diverter arm is incorporated into an example system that aligns and orders randomly oriented bottles through the use of a rotating plate and a rotating channel.
Figure 4:
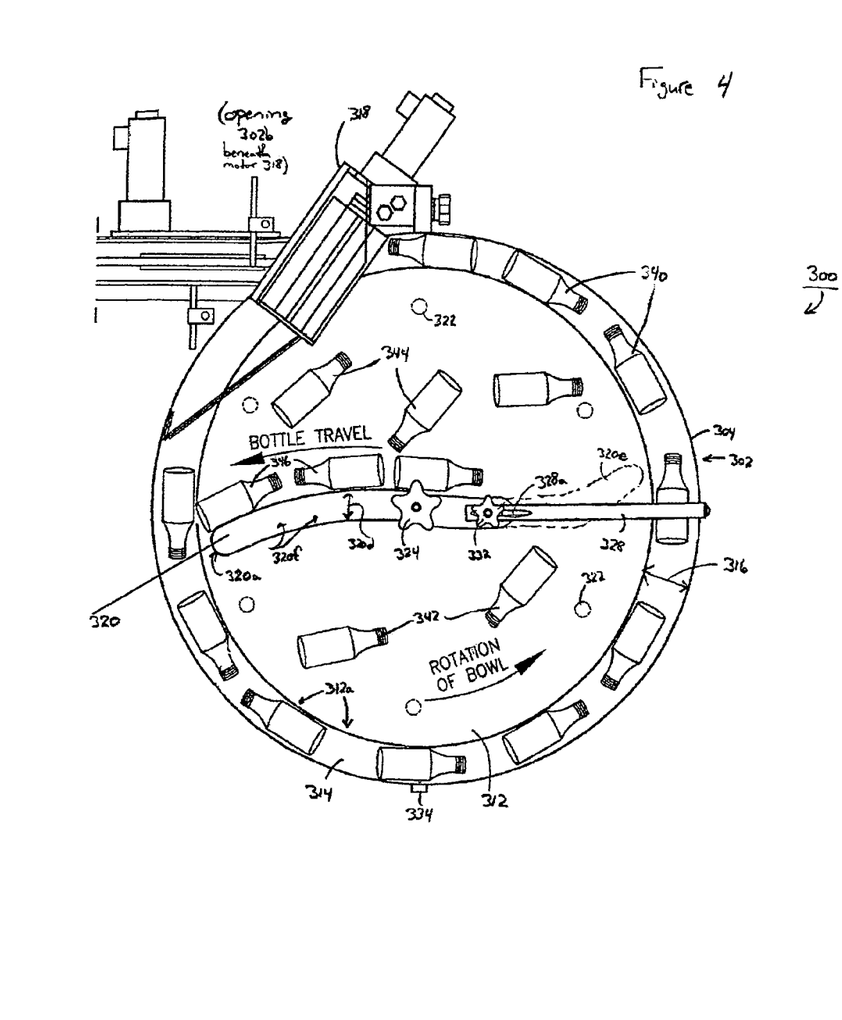
FIG. 4 shows a top plan view of the example diverter arm and system illustrated by FIG. 3A.

Referring now to FIGS. 3A and 4, there is illustrated an example diverter arm 320 according to an example embodiment of the present invention, the diverter arm being shown as part of example bottle unscrambling system 300. Note that FIG. 3A shows a side plan view of diverter arm 320 and system 300 and FIG. 4 shows a top plan view of diverter arm 320 and system 300. Reference will first be made to example system 300 and then to example diverter arm 320 and an example operation thereof.

As shown, example system 300 includes tub 302, top plate 312, feeder plate 314, motor 308, and diverter arm 320. Tub 302 includes circular feeder ring 304 and base plate 306, which is located at a bottom side of the tub and is fixably connected to feeder ring 304. Tub 302 is open along its top side 302a and also includes an opening 302b along feeder ring 304 (note that opening 302b is beneath wiper motor 318 as illustrated in FIG. 4). Motor 308 includes a shaft 310 that freely extends up through base plate 306 and into tub 302.

Top plate 312 and feeder plate 314 are situated inside tub 302 and lie in parallel planes, for example, one on top of the other, with each plate parallel to and above the plane formed by base plate 306. Feeder plate 314 is approximately the same diameter as feeder ring 304, for example, while top plate 312 has a diameter selected to be smaller than that of feeder plate 314. In operation, the centers of plates 312 and 314 are inserted over shaft 310 such that the shaft extends up through each plate. Spacers 322 are inserted between the two plates thereby defining a height/distance between the two plates. This arrangement of top plate 312, feeder plate 314, and spacers 322 is interlocked to shaft 310 through screw knob 324, for example, thereby causing motor 308 to freely rotate both plates within tub 302 As shown in this example system, top plate 312 and spacers 322 are interchangeable (although they do not need to be) through the removal and insertion of screw knob 324, thereby allowing different top plates 312, with varying diameters, and different spacers 322, with varying heights, to be inserted into the system.

Accordingly, based on the size of top plate 312 and the height of spacers 322, a variable height and width channel 316 is formed between the outer perimeter 312a of plate 312 and the inner perimeter of feeder ring 304. Feeder ring 304 and perimeter edge 312a of top plate 312 form the edges/sides of this channel while the surface of feeder plate 314 forms the bottom surface of the channel.

As further described below, in an example operation of system 300 according to an example embodiment of the invention, bottles enter system 300 onto the surface of top plate 312 and generally land on their sides (e.g., as shown by bottles 342 and 344). As plate 312 rotates, these bottles move towards and eventually contact diverter arm 320 (e.g., as shown by bottles 346), which guides the bottles outward from plate 312 and into channel 316. Channel 316 then causes the bottles to align with their tops and bottoms facing one another (e.g., as shown by bottles 340). As such, the width of channel 316, which is determined by the diameter of top plate 312, is set, for example, to correspond to the smallest width of the bottles to be aligned (e.g., see bottles 340a in FIG. 3A). Such a width ensures multiple bottles do not enter the channel lying next to one another. Similarly, the height of the channel, which is determined by spacers 322, is set, for example, such that the bottles fall into the channel and such that the bottles also extend partially above the surface of top plate 312 when within the channel (e.g., see bottles 340a in FIG. 3A). In this way, the bottles in channel 316 create a small ridge that extends above the surface of top plate 312, thereby preventing multiple bottles from easily entering and stacking within the channel, for example. Once the bottles are in channel 316, feeder plate 314 moves the bottles around the inner perimeter of feeder ring 304 towards opening 302b where the bottles are discharged for subsequent processing. Note that the feeder ring may also include wear strip 330 along the circumference of the channel to ensure bottles are not scrapped as the move through the system.

Note further that rather than forming a rotating top plate and corresponding rotating channel using two rotating plates, as described in example system 300, one skilled in the art will recognize that there are other ways to form such a structure and any such structure may be used. For example, rather than using two plates, system 300 may include only a single plate molded to include a recessed channel around the outer perimeter thereof.

Figure 3B:
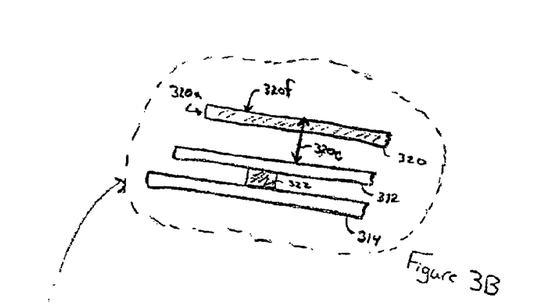
FIG. 3B is a side plan view of a section of the example diverter arm and system illustrated by FIG. 3A.

Turning now to example diverter arm 320, according to an example embodiment of the present invention the arm is situated in tub 302 and resides over the top surface of top plate 312, with end 320a of the arm extending outward towards the plate's outer perimeter 312a. As seen in FIG. 3B, which is an expanded view of a section of FIG. 3A, the top side (or top surface) 320f of diverter arm 320 is at a distance 320c above the surface of top plate 312 and forms a plane that is parallel, for example, to the surface of top plate 312 (i.e., the distance 320c is uniform, for example, across the length of the diverter arm). According to an example embodiment of the invention, unlike top plate 312 and feeder plate 314, diverter arm 320 remains in a stationary position while system 300 operates. In general, note that the diverter arm may be coated with a finishing, for example, to prevent the arm from scratching bottles that contact the arm.

As illustrated in FIGS. 3A, 3B, and 4, example diverter arm 320 has a pronounced width 320d and is relatively thin, thereby forming a pronounced space above top plate 312. In addition, as further illustrated in FIG. 4, example diverter arm 320 extends from the center of plate 312 outward, in one direction, in a semi-arc like fashion, with the arc bending/pointing towards the direction of rotation of top plate 312.

One skilled in the art will recognize, however, that other variations and shapes of diverter arm 320 are possible without deviating from the present invention. For example, rather than extend outward from the center of top plate 312, diverter arm 320 may originate from a position offset from the plate's center. In addition, rather than have an arc-like shape, the diverter arm may extend straight outward. Also, rather than extend in only a single direction towards perimeter 312a of top plate 312, the diverter arm may extend in two or more directions towards the plate's perimeter (as represented by the dotted portion 320e of the diverter arm in FIG. 4, for example). Furthermore, rather than being a thin arm that forms a pronounced space above top plate 312, the diverter arm may extend to the surface of the top plate, for example, as shown by the side view of example diverter arm 320 in FIG. 5A, for example. In addition, rather than having a pronounced width 320d, diverter arm 320 may have a relatively thin width, for example, as shown by the top-down-view of example diverter arm 320 in FIG. 5B, for example.

Referring again to FIG. 3A, when connecting example diverter arm 320 to example system 300, a diverter arm spacer 326, for example, may be inserted between the diverter arm and top plate 312, this spacer defining the height/distance 320c between the top side or top surface 320f of the diverter arm and the surface of top plate 312. The combination of this spacer and the diverter arm is inserted over shaft 310 such that the shaft extends up through the spacer and arm. The diverter arm and spacer are then secured to system 300 through screw knob 324. As indicated, according to an example embodiment of the invention, the diverter arm remains stationary during operation and as such, shaft 310 does not interconnect the arm to motor 308.

As further illustrated in FIGS. 3A and 4, example diverter arm 320 is also secured to example system 300 through mounting bracket 328, diverter support screw 330, and support knob 332, although other mounting mechanisms may be used. Here, mounting bracket 328 is attached to feeder ring 304 and extends towards the center of tub 302 perpendicular to feeder ring 304. Support screw 330 is attached to end 320b of diverter arm 320 (e.g., by using a screw and nut), and extends perpendicularly upward from the arm and through an installation slot 328a in mounting bracket 328. Support screw 330 is then secured to mounting bracket 328 through support knob 332.

According to an example embodiment of the invention and as illustrated by example system 300, example diverter arm 320 may be interchangeable, similar to top plate 312, so that the length of the arm can be set to correspond to the radius of the top plate 312 currently being used. For example, the length of diverter arm 320 may extend approximately or substantially to the outer perimeter 312a of top plate 312, as shown by example system 300.

Figure 5A:
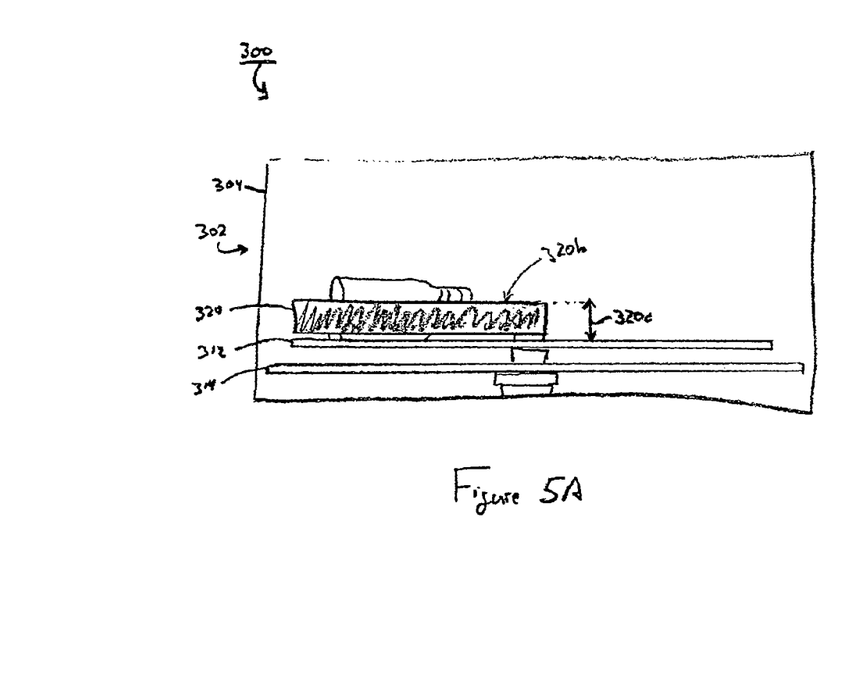
FIGS. 5A and 5B show further example diverter arms according to the present invention.
Figure 5B:
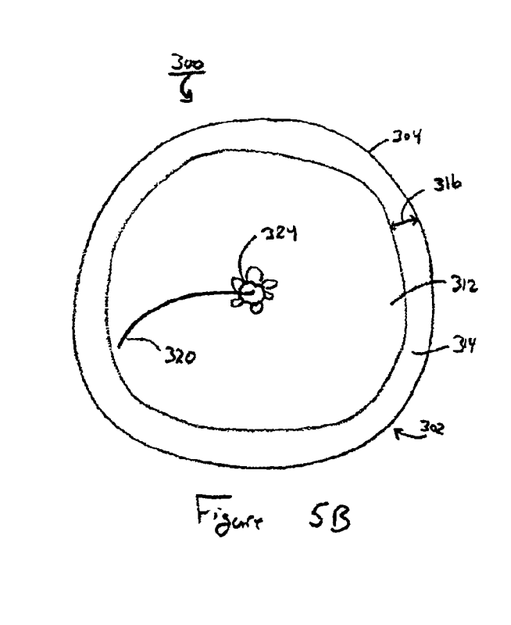

Note further that according to an example embodiment of the invention, the distance 320c between the diverter arm's top side 320f and the surface of top plate 312 may also be adjustable. In example system 300, this adjustment is made by interchanging diverter arm spacer 326 and by adjusting support knob 332 to vary the vertical height of support screw 330. As further described below, this height 320c is purposely selected based on the dimensions of the bottles to be aligned and ordered. One skilled in the art will recognize, however, that there are other ways to set the distance 320c between top side 320f of the diverter arm and the surface of top plate 312. For example, rather than use spacer 326 and a thin diverter arm as shown in FIG. 3A, the diverter arm can have a vertical width equal to the height 320c, as shown in FIG. 5A, for example. One skilled in the art will also recognize that the ability to interchange the length and height of the diverter arm is not specific to the invention and a fixed length/height diverter arm can also be used.

Turning now more specifically to the distance 320c between the diverter arm's top side (or top surface) 320f and the surface of top plate 312, unlike the arm structures of prior systems, the diverter arm according to an example embodiment of the invention is not a wall like structure that blocks all forward movement of bottles on the surface of top plate 312 as the bottles rotate against the arm. Rather, the distance 320c is such that arm 320 only impedes the forward movement of these bottles and does not necessarily prevent the bottles from passing over the arm. More specifically, as an increased number of bottles begin to back-up behind the diverter arm as bottles wait to enter channel 316, the increased pressure caused by these additional bottles and the rotation of plate 312 may cause some bottles to buckle upward, for example. Rather than continuing to block these buckling bottles and to force these bottles outward to channel 316 as in prior systems, according to an example embodiment of the invention the distance 320c that the diverter arm extends above top plate 312 is such that these buckling bottles now extend above the upper edge of top side 320f of the arm, for example. As a result, these bottles get diverted/pushed up and over the arm.

Figure 6A:
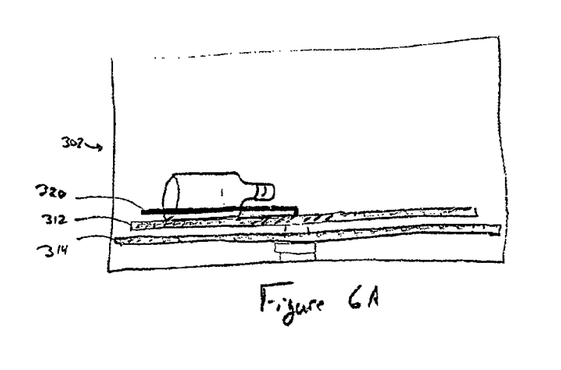
FIGS. 6A, 6B, and 6C illustrate an example operation of a diverter arm according to the present invention.
Figure 6B:
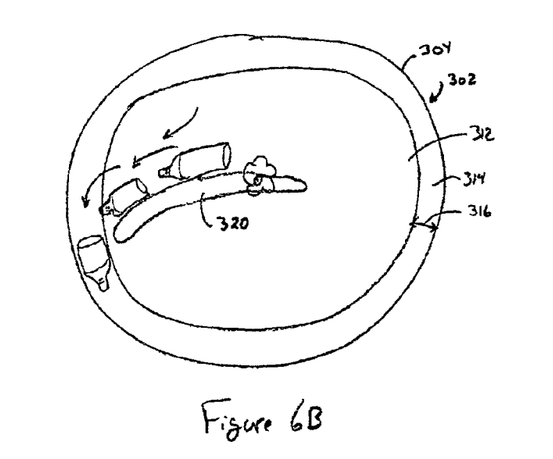
Figure 6C:
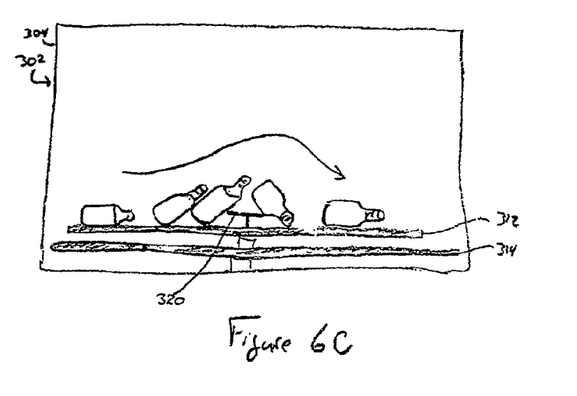

More specifically, the distance 320c between top surface 320f of the diverter arm and the surface of top plate 312 is set, for example, such that for those bottles that are lying substantially flat on their sides against top plate 312, a substantial portion of the bottles extends above the arm, as shown in the side view of diverter arm 320 in FIG. 6A, for example. In this orientation, a sufficient portion of the bottles is still below top side 320f of the diverter arm so that as these flat lying bottles contact the diverter arm, the arm diverts the bottles outward to the channel as shown, for example, in the top-down view of FIG. 6B. However, as an increased number of bottles begin to back-up behind the diverter arm, some bottles may buckle upward, for example. Because a substantial portion of the bottles naturally lies above the diverter arm, as these bottles buckle, they will extend to a height above the arm (e.g., above height 320c) so that the arm is no longer able to divert them outward. At this point, the continued rotation of top plate 312, for example, pushes the bottles over the arm as shown in FIG. 6C, for example (note that in FIG. 6C the diverter arm is extending directly outward from the Figure).

In addition to simply allowing buckled bottles to pass over the arm, according to an example embodiment of the invention, the distance 320c of the arm is set such that the arm also pro-actively alleviates bottle-necks behind the arm. Specifically, the distance 320c is set such that as flat lying bottles, for example, initially contact the arm, the pressure exerted on these bottles by rotating plate 312 is sufficient to cause the bottles to divert outward, but is not sufficient to cause the bottles to divert upward relative to the arm. As an increased number of bottles begin to back-up behind the arm, however, the pressure on the bottles along the arm will naturally increase. As this pressure increases on the bottles along the arm, these bottles will find it easier to move over the arm, rather than along the arm. As such, the arm will begin to act like a scoop, for example, pushing under these bottles and causing them to buckle and pass over the arm (i.e., rotating top plate 312 will push these bottles over the arm). In this way, the diverter arm not only diverts bottles outward, but also assists in alleviating bottle-necks.

Turning now to an overall example operation of system 300 and diverter arm 320, according to an example embodiment of the invention randomly oriented bottles are initially dropped onto the surface of top plate 312, as shown in FIG. 4

(e.g., see bottles 342). As indicated, these bottles will generally land on their sides. Through the rotation of plate 312, some bottles may move outward and into channel 316. Other bottles, however, will rotate in a forward direction (i.e., in a circular path) with plate 312 (e.g., see bottles 344) and will eventually contact diverter arm 320, for example, as shown by bottles 346. As indicated, the height 320c of the arm is set to impede the forward motion of the bottles 346. As such, the arm will initially guide/divert these bottles outward towards channel 316 as plate 312 continues to rotate. As specified, bottles 340 within the channel extend above top plate 312, for example, forming a small ridge. As such, bottles 346 will remain along the arm until a gap is encountered in the channel, at which point the arm will guide the bottles into this gap. As such, the diverter arm according to an example embodiment of the invention, diverts bottles from plate 312 outward to the channel.

Referring now to FIG. 6C, assuming space is not immediately available in channel 316, multiple bottles may begin to bunch-up around the diverter arm 320, for example. As bottles continue to back-up, the increased pressure on the bottles may cause some bottles to buckle upward, for example, relative to top plate 312 and diverter arm 320, as shown by FIG. 6C. Because the diverter arm has a reduced height 320c relative to the bottles lying flat on plate 312, the arm does not completely block all forward motion of the bottles, as described earlier. As such, these buckling bottles rise to a height above the diverter arm, for example, such that the continued rotation of plate 312 pushes the bottles up and over the arm rather than into the channel. Similarly, as described above, the height of the arm can also be set such that the arm operates like a scoop, for example, to help alleviate any back-up. Regardless, the bottles that pass over the arm then return to the surface of top plate 312 and continue in a forward direction either moving outward and into channel 316 through the rotation of top plate 312 or rotating back around to the diverter arm and continuing as described above.

Continuing with FIG. 4, once the bottles are in channel 316 (e.g., see bottles 340), feeder plate 314 rotates the bottles towards opening 302b in feeder ring 304. Residing over opening 302b is wiper motor 318, for example, that contacts the bottles in the channel and directs them out of tub 302, through opening 302b, to subsequent systems for processing. Note further that system 300 may also include fiber optic eye 334 along channel 316 that detects the presence/absence of bottles in the channel. When the channel is empty, the eye causes additional random bottles to be dropped onto top plate 312 for aligning.

Advantageously, because the diverter arm of the present invention allows buckling bottles to move up and over the arm rather than completely blocking their forward motion, the bunching up of bottles behind the arm is relieved, thereby allowing bottles to more freely enter the channel and fill available openings. In addition, rather than the buckling bottles entering the channel and thereby overlapping and stacking upon one another, buckling bottles by-pass the channel and continue forward. As a result, a diverter arm according to an example embodiment of the invention increases the flow of bottles moving from plate 312 towards channel 316 while also preventing the bunching and buckling of bottles along and within the channel and as such, increases the number of properly aligned bottles that reside in the channel.

Note that as shown in FIG. 3A, example system 300 is tilted to one side, in the direction along which the diverter arm radially extends towards the perimeter of plate 312. Such orientation may assist in diverting bottles outward along diverter arm 320. Nonetheless, note that system 300 may also reside in a flat orientation.

Figure 7A:
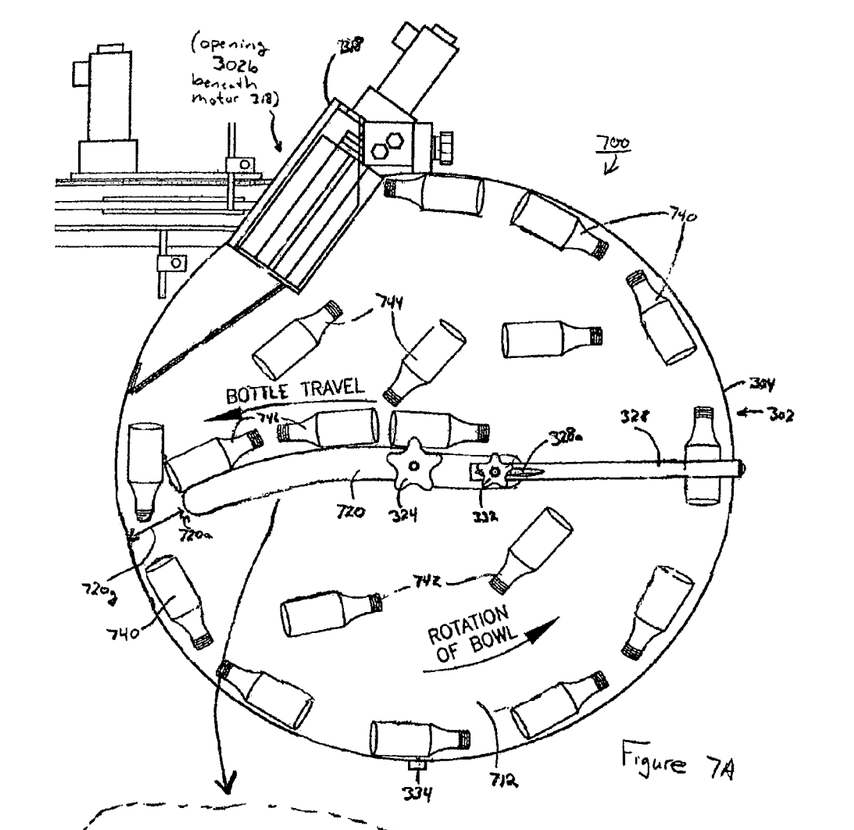
FIG. 7A shows a top plan view of an example diverter arm according to the present invention where the diverter arm is incorporated into an example system that aligns and orders randomly oriented bottles along a wall of the system.

Referring now to FIG. 7A, there is illustrated example diverter arm 720 according to an example embodiment of the present invention. Here, diverter arm 720 is illustrated in combination with example bottle unscrambling system 700. In general, note that example system 700 is similar to example system 300 but does use an outer channel 316 to align and order items, such as bottles. Rather, example system 700 now uses the inner perimeter of the tub's feeder ring 304, for example, to perform the aligning and ordering of bottles, as described below.

Specifically, example system 700 includes a tub 302 with circular feeder ring 304, a single rotating top plate 712 rather than two plates that form a channel as describe above, and example diverter arm 720. The diameter of plate 712 is approximately the same diameter as feeder ring 304, for example, extending towards the inner perimeter of the ring. Similar to above, plate 712 connects to a shaft and motor that freely rotates the plate within the tub.

As for diverter arm 720, according to an example embodiment of the invention, the arm is similar to arm 320 and resides within tub 302 over the top surface of top plate 712, with end 720a of the arm extending outward towards the inner perimeter of feeder ring 304. A space 720g exists between the end 720a of diverter arm 720 and the inside perimeter of feeder ring 304 to allow bottles to pass between the arm and ring. As indicated, in example system 700, bottles are aligned along the inner perimeter of feeder ring 304. As such, space 720g is needed to allow bottles to pass beyond the diverter arm. As an example, space 720g can correspond to the approximate width of a single bottle. In this way, the diverter arm causes a single row of aligned bottles to form around the inner perimeter of the feeder ring.

Note that although example diverter arm 720 is shown in FIG. 7A as having a particular shape and form, one skilled in the art will recognize that other variations and shapes for the arm are possible, as was described for arm 320, without deviating from the present invention. Also, similar to example arm 320, diverter arm 720 can interconnect to system 700 such that it is interchangeable in length and height to correspond to the size/shape of the bottles being aligned. Nonetheless, one skilled in the art will again recognize that diverter arm 720 need not be adjustable in height and length.

Figure 7B:
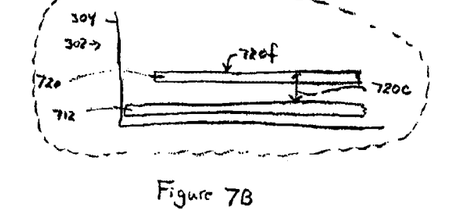
FIG. 7B shows a side plan view of a section of the example diverter arm and system illustrated by FIG. 7A.

Turning now to FIG. 7B, there is seen a side view of a section of example system 700, and in particular, a section of example diverter arm 720 and top plate 712. Like diverter arm 320, the top surface 720f of diverter arm 720 is set at distance 720c above the surface of top plate 712 and forms a plane that is parallel, for example, to the surface of top plate 712. Again, according to an example embodiment of the invention, the distance 720c that arm 720 extends above the surface of plate 712 is such that arm 720 does not function as a wall-like structure that blocks all forward movement of bottles on top plate 712. Rather, height 720c is set so that diverter arm 720 only impedes this forward movement and allows buckling bottles to pass over the arm and in a further aspect, is set so that the arm operates as a scoop-like structure, for example, as described above.

Turning now to an example operation of diverter arm 720, according to an example embodiment of the invention randomly oriented bottles are initially dropped onto the surface of top plate 712 and will generally land on their sides (e.g., see bottles 742). Through the rotation of plate 712, some of these bottles may move towards the outer perimeter of the plate and align along feeder ring 304. Other bottles, however, will rotate in a forward direction with plate 712 (e.g., see bottles 744) and will eventually contact diverter arm 720, for example, as shown by bottles 746. Like arm 320, the height 720c of arm 720 is set to impede the forward motion of bottles 746. As such, arm 720 will initially guide/divert these bottles outward towards the end 720a of the arm. The bottles will remain in this position until a gap is encountered along the inner perimeter of feeder ring 304, at which point diverter arm 720 will guide the bottles into this gap, passing the bottles between the arm and ring and thereby aligning the bottles along the perimeter of the ring (e.g., see bottles 740). Once aligned, plate 712 rotates the bottles towards opening 302b in feeder ring 304, where the bottles are directed out of tub 302 for subsequent processing.

Assuming, however, that space is not immediately available along ring 304, multiple bottles may begin to bunch-up around arm 720. As bottles continue to back-up, the increased pressure may cause some bottles to buckle upward, for example, relative to top plate 712 and diverter arm 720. Again, because of the diverter arm's reduced height 720c relative to the bottles lying on the surface of the plate, the continued rotation of plate 712 pushes these buckling bottles up and over the aim, thereby relieving the back-up and preventing buckling bottles from aligning along the ring. Similarly, the height of the arm can also be set such that the arm operates like a scoop, for example, to help alleviate the back-up. Regardless, the bottles that pass over the arm then return to the surface of top plate 712 and continue in a forward direction, either moving outward towards the perimeter of ring 304 through the rotation of top plate 712 or rotating back around to the diverter arm and continuing as described above.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A system for aligning items, comprising:
   a plate having an outer perimeter and a top surface, wherein the items are intended to initially rest on the top surface of the plate and the plate is intended to move the items though the system;
   a diverter arm with a length and a top side, the diverter arm residing over the top surface of the plate and extending substantially over its length towards the outer perimeter of the plate; and
   wherein the top side of the diverter arm and the top surface of the plate are configured to have a distance based on dimensions of the items such that when a first pressure is exerted on items near or contacting the diverter arm, the near or contacted items move along the length of the diverter arm towards the outer perimeter of the plate and when a second pressure, greater than the first pressure, is exerted on the items near or contacting the diverter arm, the near or contacted items pass over the diverter arm.

2. The system of claim 1, further comprising an aligning mechanism surrounding the outer perimeter of the plate and intended for aligning the items; and
   wherein the diverter arm guides the near or contacted items that move along the length of the diverter arm towards the aligning mechanism.

3. The system of claim 2, wherein the aligning mechanism is a channel.

4. The system of claim 3, wherein a diameter of the plate defines a width of the channel and wherein the plate is interchangeable thereby creating a variable width channel.

5. The system of claim 4, wherein the diverter arm is interchangeable to correspond to the plate.

6. The system of claim 2, wherein the aligning mechanism is a wall perpendicular to and extending above the top surface of the plate.

7. The system of claim 1, wherein the system is tilted towards a direction in which the diverter arm extends towards the outer perimeter of the plate.

* * * * *